United States Patent
Isono (10) Patent No.: US 11,428,296 B2
(45) Date of Patent: Aug. 30, 2022

(54) GEARED SPEED REDUCING UNIT (71) Applicant: TOYOTA JIDOSHA KABUSHIKI KAISHA, Toyota (JP)

(72) Inventor: Hiroshi Isono, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/494,943

(22) Filed: Oct. 6, 2021

(65) Prior Publication Data
US 2022/0112938 A1 Apr. 14, 2022

(30) Foreign Application Priority Data

Oct. 14, 2020 (JP) .............................. JP2020-173123

(51) Int. Cl.
*F16H 1/32* (2006.01)
*F16H 57/08* (2006.01)

(52) U.S. Cl.
CPC .............. *F16H 1/32* (2013.01); *F16H 57/082* (2013.01); *F16H 2001/324* (2013.01); *F16H 2001/327* (2013.01); *F16H 2001/328* (2013.01)

(58) Field of Classification Search
CPC .... F16H 1/32; F16H 57/082; F16H 2001/324; F16H 2001/327; F16H 2001/328
See application file for complete search history.

(56) References Cited

U.S. PATENT DOCUMENTS

| | | | |
|---|---|---|---|
| 6,607,461 B2 * | 8/2003 | Hagiike | .................. H02K 7/06 475/181 |
| 7,588,259 B2 * | 9/2009 | Azekatsu | ........... B60G 21/0555 280/5.502 |
| 7,699,136 B2 * | 4/2010 | Yamanaka | ............. B62D 5/008 180/444 |
| 2019/0285143 A1 | 9/2019 | Sasaki et al. | |
| 2022/0082163 A1 * | 3/2022 | Isono | ...................... F16H 48/36 |

FOREIGN PATENT DOCUMENTS

| | | | | |
|---|---|---|---|---|
| JP | 2000-120810 A | | 4/2000 | |
| JP | 5970650 B2 | | 8/2016 | |
| JP | 2018194120 A | * | 12/2018 | ............... F16H 1/32 |
| JP | 2019-158088 A | | 9/2019 | |

\* cited by examiner

*Primary Examiner* — Sherry L Estremsky
(74) *Attorney, Agent, or Firm* — Sughrue Mion, PLLC (57) ABSTRACT

A compact geared speed reducing unit having a simple structure that can establish a large speed reducing ratio. The geared speed reducing unit comprises: a first rotary shaft and a second rotary shaft arranged coaxially; a fixed first sun gear; a second sun gear rotated integrally with the second rotary shaft; a first ring gear meshing with the first sun gear; a second ring gear rotated integrally with the first ring gear and meshed with the second sun gear; and an eccentric carrier supporting the ring gears such that the ring gears rotate around an eccentric axis and revolve around a common rotational axis of the rotary shafts. A gear ratio between the first sun gear and the first ring gear and a gear ratio between the second sun gear and the second ring gear are set to different values.

8 Claims, 5 Drawing Sheets

GEARED SPEED REDUCING UNIT

CROSS REFERENCE TO RELATED APPLICATION

The present disclosure claims the benefit of Japanese Patent Application No. 2020-173123 filed on Oct. 14, 2020, with the Japanese Patent Office, the disclosures of which are incorporated herein by reference in its entirety.

BACKGROUND

Field of the Disclosure

Embodiments of the present disclosure relate to the art of a geared speed reducing unit having an internal contact type planetary gear set.

Discussion of the Related Art

Up to now, a complex planetary gear unit, a magical planetary gear speed reducing mechanism, an internal contact type planetary gear set, and a strain wave gearing are well known in the art to establish a relatively large reduction ratio. JP-A-2000-120810 describes a reduction gear having an internal contact type planetary gear set combined with a geared motor. According to the teachings of JP-A-2000-120810, specifically, the internal contact type planetary gear set having cycloid gears is arranged in a housing of the geared motor to serve as a reduction mechanism.

JP-A-2019-158088 describes a cycloid speed reducer having cycloid gears. The cycloid speed reducer taught by JP-A-2019-158088 comprises a plurality of an outer pins as internal gears arranged at regular intervals in a circular manner, and the cycloid gears individually having an external cycloid tooth. In the cycloid speed reducer taught by JP-A-2019-158088, the cycloid gear revolves within the outer pins arranged in a circular manner while contacting to the outer pins from radially inner side. The cycloid speed reducer described in JP-A-2019-158088 is also arranged in a housing of the geared motor to serve as a gear head.

JP-B2-5970650 also describes a cycloidal gear mechanism having an internal contact type planetary gear set. According to the teachings of JP-B2-5970650, the internal contact type planetary gear set is arranged in a housing formed by a pair of exterior members being opposed to each other. In the internal contact type planetary gear set described in JP-B2-5970650, a first rotary shaft is supported by one of the exterior members while being allowed to rotate around a predetermined rotational axis. An eccentric portion is formed on the first rotary shaft at a portion other than a portion supported by the exterior members, and a two-stage gear is supported by the eccentric portion while being allowed to rotate in an eccentric manner around the eccentric portion along an orbital path governed by an eccentric motion of the first rotary shaft. Specifically, the two-stage gear comprises an external gear formed on one of axial ends, and an internal gear formed on the other one of axial ends. That is, the two-stage gear has a stepped cross-section so that the external gear and the internal gear are axially isolated from each other. In the two-stage gear, the external gear meshes with a fixed internal gear fixed to one of the exterior members from radially inner side in an eccentric manner. According to the teachings of JP-B2-5970650, a cycloid gear is adopted as the external gear, the internal gear, and the fixed internal gear, respectively. Therefore, when the first rotary shaft rotates, the eccentric portion rotates eccentrically so that the two-stage gear revolves around the rotational axis. In this situation, an engagement site of the external gear with the fixed internal gear is rotated so that the two-stage gear is rotated in accordance with a gear ratio between the external gear and the internal gear. On the other hand, the internal gear meshes with an external gear of a transmission gear fixed to a second rotary shaft supported by the other one of the exterior members in a rotatable manner. That is, the transmission gear is rotated integrally with the second gear. Specifically, an engagement site between the internal gear and the transmission gear rotates around the rotational axis in response to the eccentric motion (i.e., a revolution) of the two-stage gear. As a result, a torque is transmitted between the internal gear and the external gear.

That is, in the internal contact type planetary gear set taught by JP-B2-5970650, the first rotary shaft serves as a carrier, the external gear and the internal gear of the two-stage gear serve as a planetary gear, the fixed internal gear serves as a ring gear, and the transmission gear serves as a sun gear. In the internal contact type planetary gear set taught by JP-B2-5970650, given that the first rotary shaft serves as an input shaft, the second rotary shaft serves as an output shaft, and a rotational speed of the output shaft is reduced lower than that of the input shaft.

For example, the geared motor combined with the speed reducing mechanism (i.e., the gear head) as described in JP-A-2000-120810 and JP-A-2019-158088 are mounted on industrial machines such as an automobile and a robot. An output torque of the geared motor of this kind may be multiplied with a larger multiplication factor by increasing a speed reducing ratio of the speed reducing mechanism. Consequently, the geared motor may be downsized to be fitted easily into the industrial machines. That is, the industrial machine equipped with the downsized geared motor may also be downsized. To this end, it is preferable to increase the speed reducing ratio of the speed reducing mechanism as much as possible. For example, a speed reducing ratio of the above-mentioned complex planetary gear unit or the magical planetary gear speed reducing mechanism may be increased by combining a plurality of planetary gear sets. However, as a result of combining the planetary gear sets, a structure of the speed reducing mechanism of those kinds would be complicated and a size of the speed reducing mechanism of those kinds would be enlarged. On the other hand, a speed reducing ratio of the speed reducing mechanism having the strain wave gearing may be greater than 100. However, since a strain gear which rotates while deforming amorphously is adopted as a ring gear, a strength of the strain wave gearing is restricted. In addition, a structure of the speed reducing mechanism having the strain wave gearing is rather complicated. Therefore, as the reduction gear described in JP-A-2000-120810 and the cycloid speed reducer described in JP-A-2019-158088, high processing accuracy and high assembling accuracy are required to manufacture the speed reducing mechanism having the strain wave gearing. For this reason, a manufacturing cost of the speed reducing mechanism having the strain wave gearing is rather expansive compared to other kinds of conventional speed reducing gearing.

As described, the cycloidal gear mechanism taught by JP-B2-5970650 comprises the internal contact type planetary gear set including the external gears such as the two-stage gear and the fixed internal gear, and the internal contact type planetary gear set including the internal gears such as the two-stage gear and the transmission gear. In general, in the internal contact type planetary gear set, a maximum speed reducing ratio can be established given that a difference between teeth numbers of the internal gear and the external gear is 1. Given that a reasonable and conventional involute gear is adopted as the above-mentioned internal gear and the external gear, respectively, tips of the internal gear and the external gear will interfere with each other, and hence a difference between teeth numbers of the internal gear and the external gear may not be 1. In order to adjust the difference between teeth numbers of the internal gear and the external gear to 1, according to the teachings of JP-B2-5970650, a relatively expansive cycloid gear is adopted as the internal gear and the external gear, respectively. In other words, the maximum speed reducing ratio may not be achieved in the internal contact type planetary gear set described in JP-B2-5970650 unless the relatively expansive cycloid gear is employed. In addition, in internal contact type planetary gear set described in JP-B2-5970650, the external gear and the internal gear are formed on the two-stage gear. Therefore, diameters and teeth numbers of the external gear and the internal gear are restricted by the dimensions of the two-stage gear. In other words, degrees of freedom in design of each of the external gear and the internal gear is not so wide. That is, it is not easy to adjust the difference between teeth numbers of the internal gear and the external gear to 1 in the internal contact type planetary gear set described in JP-B2-5970650. In the cycloidal gear mechanism taught by JP-B2-5970650, a total speed reducing ratio is increased by reducing a difference between gear ratios of the internal contact type planetary gear sets. However, as described, it is not easy to adjust the gear ratios of the internal contact type planetary gear sets. That is, flexibility of the speed reducing ratio is not high enough. Therefore, even if the difference between teeth numbers of the internal gear and the external gear can be adjusted to 1 in each of the internal contact type planetary gear sets, the total speed reducing ratio of the cycloidal gear mechanism taught by JP-B2-5970650 may not be increased sufficiently.

SUMMARY

Aspects of embodiments of the present disclosure have been conceived noting the foregoing technical problems, and it is therefore an object of embodiments of the present disclosure to provide a compact geared speed reducing unit having a simple structure that can establish a large speed reducing ratio.

An exemplary embodiment of the present disclosure relates to a geared speed reducing unit, comprising: a first rotary shaft and a second rotary shaft arranged coaxially with each other; a first gear that is arranged around a common rotational axis of the first rotary shaft and the second rotary shaft and that is not allowed to rotate; a second gear that is arranged around the common rotational axis to be rotated integrally with the second rotary shaft; a third gear that meshes with the first gear; a fourth gear that is arranged coaxially with the third gear to be meshed with the second gear and to be rotated integrally with the third gear; and an eccentric carrier that is arranged around the common rotational axis to support the third gear and the fourth gear such that the third gear and the fourth gear rotate around an eccentric axis offset from the common rotational axis and revolve around the common rotational axis. The geared speed reducing unit according to the exemplary embodiment of the present disclosure is adapted to reduce a rotational speed of the second rotary shaft lower than a rotational speed of the first rotary shaft. In the geared speed reducing unit, specifically, a first sun gear as an external gear serves as the first gear, a second sun gear as an external gear serves as the second gear, a first ring gear as an internal gear serves as the third gear, and a second ring gear as an internal gear serves as the fourth gear. In order to achieve the above-explained objective, according to the exemplary embodiment of the present disclosure, the eccentric carrier supports outer circumferential surfaces of the first ring gear and the second ring gear such that the first ring gear and the second ring gear are rotated by a torque delivered through the first rotary shaft around the eccentric axis while revolving around the common rotational axis. In addition, a gear ratio between the first sun gear and the first ring gear and a gear ratio between the second sun gear and the second ring gear are set to different values.

In a non-limiting embodiment, the geared speed reducing unit may further comprise a speed reducing planetary gear set that is arranged between the first rotary shaft and the eccentric carrier to reduce a rotational speed of the eccentric carrier lower than the rotational speed of the first rotary shaft.

In a non-limiting embodiment, the geared speed reducing unit may further comprise a counterbalance weight that is formed on an outer circumferential surface of the eccentric carrier to correct an unbalance of rotation of the eccentric carrier.

In a non-limiting embodiment, the geared speed reducing unit may further comprise a motor having a hollow rotor. The first rotary shaft and the eccentric carrier may be formed integrally with each other to serve as the rotor, and the first sun gear, the second sun gear, the first ring gear, and the second ring gear may be held in a hollow space of the rotor. In addition, the geared speed reducing unit may be combined with the motor to serve as a speed reducing mechanism.

In a non-limiting embodiment, the geared speed reducing unit may further comprise a counterbalance weight that is formed on an outer circumferential surface of the rotor to correct an unbalance of rotation of the rotor.

In a non-limiting embodiment, a difference between the number of teeth of the first sun gear and the number of teeth of the second sun gear may be set to 1, and a difference between the number of teeth of the first ring gear and the number of teeth of the second ring gear may be set to 1.

In a non-limiting embodiment, modules and teeth numbers of the first ring gear and the second ring gear may be equalized to each other, and the first ring gear and the second ring gear may be formed integrally with each other.

In a non-limiting embodiment, a difference between the number of teeth of the first sun gear and the number of teeth of the second sun gear may be set to 1.

Thus, the geared speed reducing unit according to the exemplary embodiment of the present disclosure comprises the first sun gear, the second sun gear, the first ring gear, the second ring gear, and the eccentric carrier. The first ring gear and the second ring gear are supported by the eccentric carrier while meshing with the first sun gear and the second sun gear, and rotate integrally around the eccentric axis that is offset from the common rotational axis of the first rotary shaft and the second rotary shaft. Specifically, when the eccentric carrier is rotated, the first ring gear and the second ring gear rotate around the eccentric axis while revolving around the common rotational axis. That is, the geared speed reducing unit according to the exemplary embodiment of the present disclosure comprises two sets of internal contact type planetary gear sets. Those internal contact type planetary gear sets have only four gears including the sun gears and the ring gears, and a planetary pinion is not employed in those internal contact type planetary gear sets. According to the exemplary embodiment of the present disclosure, a rotational speed of the second rotary shaft serving as an output shaft is reduced lower than a rotational speed of the first rotary shaft serving as an input shaft by the aforementioned two sets of internal contact type planetary gear sets. Since the first rotary shaft and the second rotary shaft are arranged coaxially, a structure of the geared speed reducing unit may be simplified and the geared speed reducing unit may be downsized.

In the geared speed reducing unit according to the exemplary embodiment of the present disclosure, the first sun gear is fixed and not allowed to rotate. Therefore, the speed reducing ratio of the geared speed reducing unit may be increased by setting a first gear ratio between the first sun gear and the first ring gear and a second gear ratio between the second sun gear and the second ring gear to different values. Since the first sun gear is fixed, if the first gear ratio and the second gear ratio are set to same values, the second sun gear would not be allowed to rotate. Consequently, the speed reducing ratio of the geared speed reducing unit would reach an infinite value and the geared speed reducing unit would not be able to function properly. In order to avoid such disadvantage, in the geared speed reducing unit, the first gear ratio and the second gear ratio are set to different values. Specifically, the speed reducing ratio of the geared speed reducing unit may be increased by reducing a difference between the first gear ratio and the second gear ratio. Therefore, the speed reducing ratio of the geared speed reducing unit may be increased arbitrarily by adjusting the first gear ratio and the second gear ratio. That is, the speed reducing ratio of the geared speed reducing unit may be selected from a wide range. For this reason, even if the less expansive involute gears are employed instead of the expensive cycloid gears, the speed reducing ratio of the geared speed reducing unit may be increased easily. According to the exemplary embodiment of the present disclosure, therefore, the geared speed reducing unit may be downsized, and the speed reducing ratio thereof can be increased by a simple structure.

In the geared speed reducing unit according to the exemplary embodiment of the present disclosure, the speed reducing planetary gear set is arranged between the first rotary shaft and the eccentric carrier to reduce a rotational speed of the eccentric carrier lower than a rotational speed of the first rotary shaft. In other words, torque of the first rotary shaft may be delivered to the eccentric carrier while being multiplied by the speed reducing planetary gear set. According to the exemplary embodiment of the present disclosure, therefore, the speed reducing ratio of the geared speed reducing unit may be further increased compared to the conventional speed reducers without having the speed reducing planetary gear set. Since the speed reducing ratio of the geared speed reducing unit may be further increased, a geared motor combined with the geared speed reducing unit may be downsized. In addition, since the geared speed reducing unit is downsized, the geared speed reducing unit may be fitted easily into a housing of the geared motor.

In the geared speed reducing unit according to the exemplary embodiment of the present disclosure, the counterbalance weight is formed on the outer circumferential surface of the eccentric carrier. As described, in the geared speed reducing unit, the internal gears such as the first ring gear and the second ring gear rotate (or revolve) eccentrically about the external gears such as the first sun gear and the second sun gear. Consequently, the eccentric carrier rotates out-of-balance due to imbalance of weight of the unit of the internal gears revolving around the rotational center axis. In order to correct such unbalance of rotation of the eccentric carrier, the counterbalance weight is formed on the eccentric carrier. To this end, for example, the counterbalance weight is formed on the eccentric carrier at a site out of phase with a heaviest portion of the unit of the internal gears by 180 degrees. In the geared speed reducing unit according to the exemplary embodiment of the present disclosure, gear teeth are not formed on the outer circumferential surfaces of the unit of the first ring gear and the second ring gear that rotates eccentrically. According to the exemplary embodiment of the present disclosure, therefore, an outer diameter of the unit of the first ring gear and the second ring gear may be reduced so that a space for the counterbalance weight may be ensured on the outer circumferential surface of the eccentric carrier. For this reason, rotations of the rotary members in the geared speed reducing unit may be stabilized by the counterbalance weight.

The geared speed reducing unit according to the exemplary embodiment of the present disclosure may be combined with a motor having a hollow rotor. In this case, the eccentric carrier and the first rotary shaft are formed integrally with the rotor, and the remaining elements of the geared speed reducing unit are held in a hollow space of the rotor. According to the exemplary embodiment of the present disclosure, therefore, the geared motor combined with the geared speed reducing unit may be downsized in the axial direction.

In the geared speed reducing unit according to the exemplary embodiment of the present disclosure, the counterbalance weight may also be formed on the outer circumferential surface of the rotor. As described, in the geared speed reducing unit, the internal gears such as the first ring gear and the second ring gear rotate (or revolve) eccentrically about the external gears such as the first sun gear and the second sun gear. Consequently, the eccentric carrier formed integrally with the rotor rotates out-of-balance due to imbalance of weight of the unit of the internal gears revolving around the rotational center axis. In order to correct such unbalance of rotation of the eccentric carrier, the counterbalance weight is formed on the rotor. To this end, for example, the counterbalance weight is formed on the rotor at a site out of phase with a heaviest portion of the unit of the internal gears by 180 degrees. In the geared speed reducing unit according to the exemplary embodiment of the present disclosure, gear teeth are not formed on the outer circumferential surfaces of the unit of the first ring gear and the second ring gear that rotates eccentrically. According to the exemplary embodiment of the present disclosure, therefore, an outer diameter of the unit of the first ring gear and the second ring gear may be reduced so that a space for the counterbalance weight may be ensured on the outer circumferential surface of the eccentric carrier. Thus, rotations of the rotary members in the geared motor may be stabilized by the counterbalance weight.

In the geared speed reducing unit according to the exemplary embodiment of the present disclosure, the difference between the number of teeth of the first sun gear and the number of teeth of the second sun gear is set to 1, and the difference between the number of teeth of the first ring gear and the number of teeth of the second ring gear is set to 1. Consequently, the first gear ratio and the second gear ratio are set to slightly different values. The speed reducing ratio of the geared speed reducing unit may be increased by reducing the difference between the first gear ratio and the second gear ratio. To this end, it is not necessarily to set a difference between the number of teeth of the first ring gear and the number of teeth of the first sun gear to 1, and to set a difference between the number of teeth of the second ring gear and the number of teeth of the second sun gear to 1. For this reason, even if the less expansive involute gears are employed instead of the expensive cycloid gears, the speed reducing ratio of the geared speed reducing unit may be increased easily.

In the geared speed reducing unit according to the exemplary embodiment of the present disclosure, the first ring gear and the second ring gear may be formed integrally while equalizing modules and teeth numbers of those gears. In this case, only a set of three gears including the first sun gear, the second sun gear, and the unit of the ring gears, and the eccentric carrier are employed in the geared speed reducing unit. According to the exemplary embodiment of the present disclosure, therefore, the structure of the geared speed reducing unit may be further simplified so that the geared speed reducing unit may be further downsized.

In the case of forming the first ring gear and the second ring gear integrally, the difference between the numbers of teeth of the first sun gear and the second sun gear, and the difference between the numbers of teeth of the first ring gear and the second ring gear will also be set to 1, respectively. In this case, therefore, the first gear ratio and the second gear ratio will also be set to slightly different values. As described, the speed reducing ratio of the geared speed reducing unit may be increased by reducing the difference between the first gear ratio and the second gear ratio. In this case, it is also not necessarily to set a difference between the number of teeth of the first ring gear and the number of teeth of the first sun gear to 1, and to set a difference between the number of teeth of the second ring gear and the number of teeth of the second sun gear to 1. For this reason, even if the less expansive involute gears are employed instead of the expensive cycloid gears, the speed reducing ratio of the geared speed reducing unit may be increased easily.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure which should not limit a scope of the present disclosure.

Figure 1:
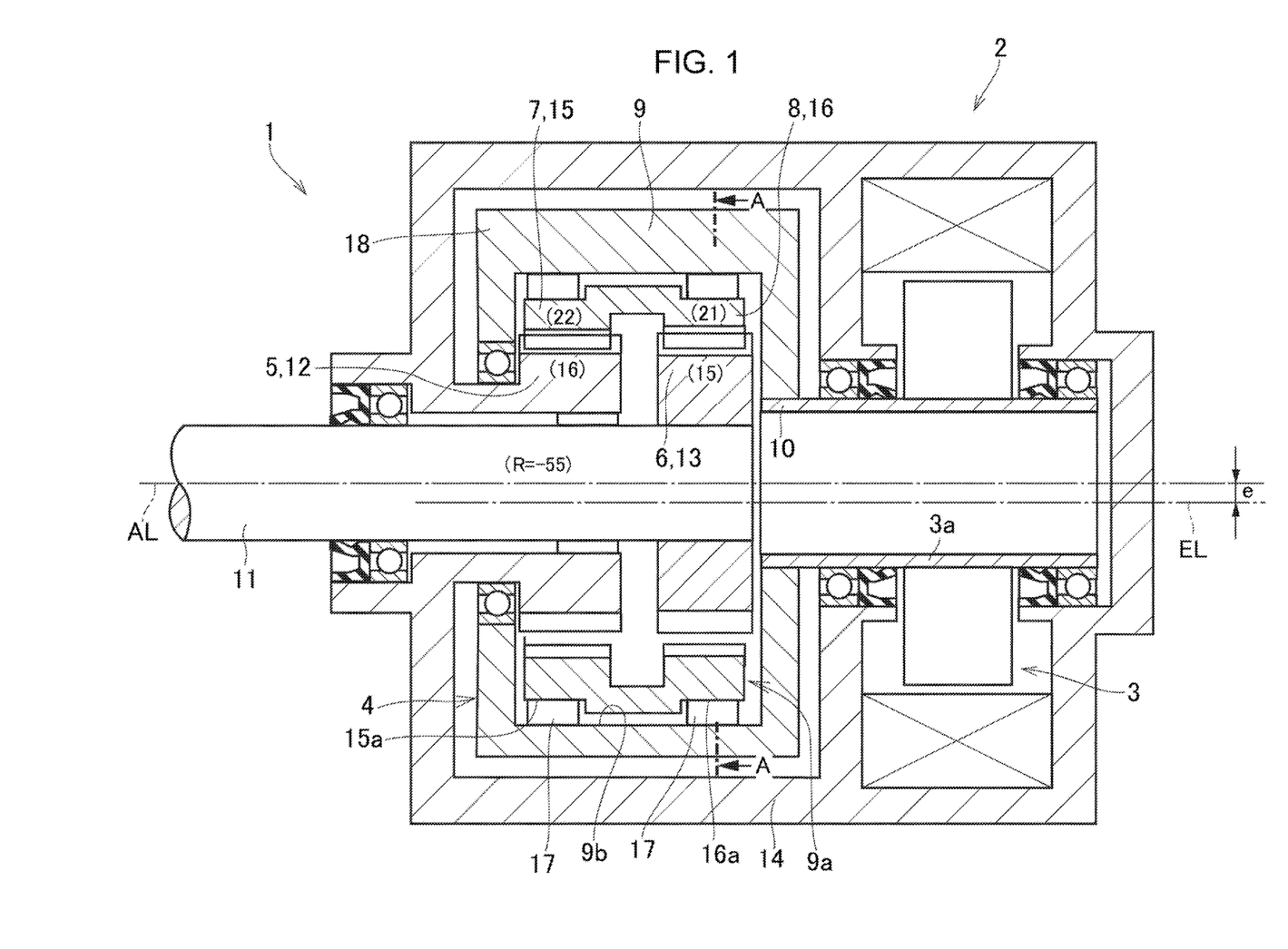
FIG. 1 is a cross-sectional view showing one example of a structure of the geared speed reducing unit according to the exemplary embodiment of the present disclosure.

Referring now to FIG. 1, there is shown a structure of a geared speed reducing unit 1 according to the exemplary embodiment of the present disclosure. The geared speed reducing unit 1 is arranged in so-called a "geared motor" 2 as a drive unit comprising an electric motor 3 and a gear head 4 as a reduction mechanism. In the geared speed reducing unit 1, the electric motor 3 is combined with the gear head 4 to establish a relatively larger speed reducing ratio.

For example, a permanent magnet type synchronous motor or an induction motor may be adopted as the electric motor 3, and the electric motor 3 generates a torque including a drive torque and a regenerative torque. The electric motor 3 and the geared speed reducing unit 1 are arranged coaxially along a rotational center axis AL.

The geared speed reducing unit 1 comprises a first gear 5, a second gear 6, a third gear 7, a fourth gear 8, an eccentric carrier 9, a first rotary shaft 10, and a second rotary shaft 11.

According to the example shown in FIG. 1, the first gear 5 and the second gear 6 are arranged coaxially around the rotational center axis AL, and the second gear 6 is allowed to rotate relatively to the first gear 5. In the geared speed reducing unit 1 shown in FIG. 1, a first sun gear 12 as an external gear serves as the first gear 5, and the first sun gear 12 is meshed with an after-mentioned first ring gear 15 serving as the third gear 7. On the other hand, a second sun gear 13 as an external gear serves as the second gear 6, and the second sun gear 13 is meshed with an after-mentioned second ring gear 16 serving as the fourth gear 8.

The first sun gear 12 has a hollow space formed around the rotational center axis AL, and is fixed to a case 14 of the geared speed reducing unit 1 and the geared motor 2. That is, first sun gear 12 is not allowed to rotate. On the other hand, the second sun gear 13 is mounted on the second rotary shaft 11 that is rotatably supported by the case 14 through a bearing so that the second sun gear 13 is rotated integrally with the second rotary shaft 11. A bearing (not shown) is interposed between the first sun gear 12 and the second sun gear 13 so that the second sun gear 13 is allowed to rotate relatively to the first sun gear 12. The second rotary shaft 11 extends coaxially with the first sun gear 12 and the second sun gear 13 along the rotational center axis AL while penetrating through the hollow space of the first sun gear 12, and a leading end of the second rotary shaft 11 protrudes from the case 14. That is, a torque multiplied by the gear head 4 of the geared speed reducing unit 1 is delivered to a predetermined external rotary member through the second rotary shaft 11. Accordingly, in the geared speed reducing unit 1 shown in FIG. 1, the second sun gear 13 serves as an output element, and the second rotary shaft 11 serves as an output shaft.

The third gear 7 and the fourth gear 8 are formed integrally around an eccentric axis EL extending parallel to the rotational center axis AL so as to rotate integrally with each other. In the geared speed reducing unit 1 shown in FIG. 1, the first ring gear 15 as an internal gear serves as the third gear 7, and the first ring gear 15 is meshed with the first sun gear 12. On the other hand, the second ring gear 16 as an internal gear serves as the fourth gear 8, and the second ring gear 16 is meshed with the second sun gear 13.

That is, the first ring gear 15 rotates around the eccentric axis EL and revolves around the first sun gear 12 rotating around the rotational center axis AL, and the second ring gear 16 rotates around the eccentric axis EL and revolves around the second sun gear 13 rotating around the rotational center axis AL. Thus, the first ring gear 15 and the second ring gear 16 revolve and rotate integrally.

Figure 2:
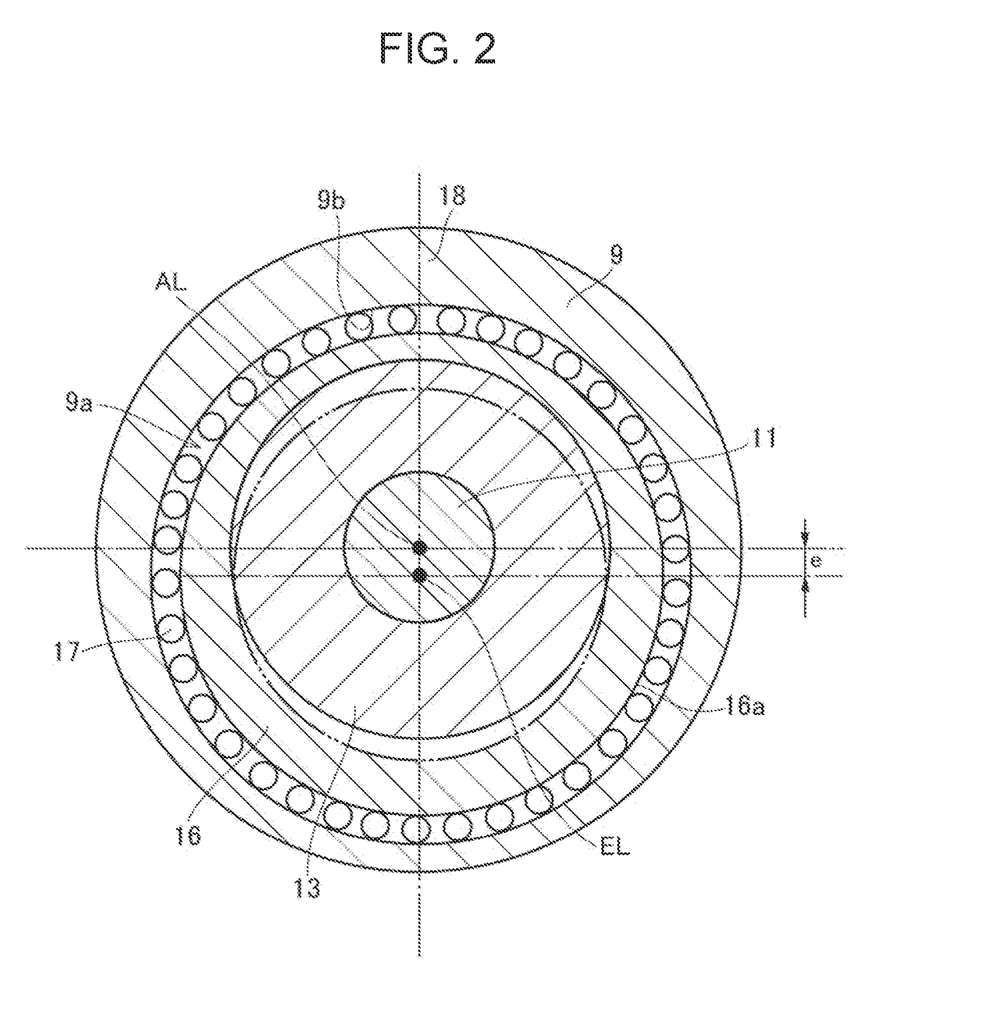
FIG. 2 is a cross-sectional view showing a cross-section of the geared speed reducing unit along A-A line in FIG. 1.

Specifically, the eccentric carrier 9 is a disc-shaped or cylindrical rotary member, and is arranged coaxially with the first sun gear 12 and the second sun gear 13. The eccentric carrier 9 is supported by bearings (not shown) in such a manner as to rotate relatively to the first sun gear 12 and the second sun gear 13, and also supported by the case 14 through another bearing (not shown) in a rotatable manner. As illustrated in FIGS. 1 and 2, the eccentric axis EL extends parallel to the rotational center axis AL of the eccentric carrier 9 and is offset from the rotational center axis AL. In the example shown in FIG. 2, the eccentric axis EL is offset downwardly from the rotational center axis AL in an amount of eccentricity e. The eccentric carrier 9 has a chamber 9a as a hollow space formed around the eccentric axis EL, and a unit of the first ring gear 15 and the second ring gear 16 is held in the chamber 9a in a rotatable manner. To this end, specifically, a roller bearing (or a needle bearing) 17 is interposed between an inner circumferential surface 9b of the eccentric carrier 9 and outer circumferential surfaces 15a and 16a of the unit of the first ring gear 15 and the second ring gear 16. That is, the outer circumferential surfaces 15a and 16a of the unit of the first ring gear 15 and the second ring gear 16 is supported by the inner circumferential surface 9b of the eccentric carrier 9.

The eccentric carrier 9 is connected to the first rotary shaft 10 and supported by the case 14 through a bearing so that the eccentric carrier 9 is rotated together with the first rotary shaft 10. Specifically, the first rotary shaft 10 extends coaxially with the first sun gear 12, the second sun gear 13, the eccentric carrier 9, and the second rotary shaft 11 along the rotational center axis AL to be joined to a rotor shaft 3a of the electric motor 3. That is, the eccentric carrier 9 is connected to the rotor shaft 3a of the electric motor 3 through the first rotary shaft 10. Accordingly, in the geared speed reducing unit 1 shown in FIG. 1, the eccentric carrier 9 serves as an input element, and the first rotary shaft 10 serves as an input shaft.

The eccentric carrier 9 is rotated by an output torque of the electric motor 3 delivered through the rotor shaft 3a and the first rotary shaft 10. Consequently, the first ring gear 15 and the second ring gear 16 held in the chamber 9a rotates around the eccentric axis EL and revolve around the rotational center axis AL. As described, in the geared speed reducing unit 1 shown in FIG. 1, the first sun gear 12 and the second sun gear 13 are engaged with the first ring gear 15 and the second ring gear 16 respectively from radially inner side in an eccentric manner. Therefore, when the eccentric carrier 9 is rotated, the first ring gear 15 and the second ring gear 16 rotate around the first sun gear 12 and the second sun gear 13 in an eccentric manner. Thus, the geared speed reducing unit 1 shown in FIG. 1 comprises two sets of internal contact type planetary gear sets commonly using the eccentric carrier 9. Specifically, those internal contact type planetary gear sets have only four gears including the first sun gear 12, the second sun gear 13, the first ring gear 15, and the second ring gear 16, and a planetary pinion is not employed in those internal contact type planetary gear sets.

In the geared speed reducing unit 1 shown in FIG. 1, a rotational speed of the second rotary shaft 11 serving as an output shaft is reduced lower than a rotational speed of the first rotary shaft 10 serving as an input shaft by the aforementioned two sets of internal contact type planetary gear sets. Since the first rotary shaft 10 and the second rotary shaft 11 are arranged coaxially, a structure of the geared speed reducing unit 1 may be simplified and the geared speed reducing unit 1 may be downsized.

As illustrated in FIG. 2, the eccentric carrier 9 is a cylindrical member, and a thickness of an upper section of the eccentric carrier 9 in FIG. 2 is increased thicker than the remaining section to serve as a counterbalance weight 18. Thus, according to the example shown in FIG. 2, the counterbalance weight 18 is formed integrally with the eccentric carrier 9 while adjusting a weight to a desirable value. Instead, the counterbalance weight 18 may also be formed separately to be attached to an outer circumferential surface of the eccentric carrier 9.

As explained above, the internal gears such as the first ring gear 15 and the second ring gear 16 rotate (or revolve) eccentrically about the external gears such as the first sun gear 12 and the second sun gear 13. Consequently, the eccentric carrier 9 rotates out-of-balance due to imbalance of weight of the unit of the internal gears revolving around the rotational center axis AL. In order to correct such unbalance of rotation of the eccentric carrier 9, the counterbalance weight 18 is formed on the eccentric carrier 9. To this end, for example, the counterbalance weight 18 is formed on the eccentric carrier 9 at a site out of phase with a heaviest portion of the unit of the internal gears by 180 degrees. According to the example shown in FIG. 1, gear teeth are not formed on the outer circumferential surfaces 15a and 16a of the unit of the first ring gear 15 and the second ring gear 16 that rotates eccentrically. Therefore, an outer diameter of the unit of the first ring gear 15 and the second ring gear 16 may be reduced so that a space for the counterbalance weight 18 may be ensured on the outer circumferential surface of the eccentric carrier 9. Thus, rotations of the rotary members in the geared speed reducing unit 1 may be stabilized by the counterbalance weight 18.

In the geared speed reducing unit 1 shown in FIG. 1, a gear ratio between the first sun gear 12 and the first ring gear 15, and a gear ratio between the second sun gear 13 and the second ring gear 16 are set to different values. In the example shown in FIG. 1, a ratio of the number of teeth of the first sun gear 12 to the number of teeth of the first ring gear 15 will be referred to as a first gear ratio $u_1$ between the first gear 5 and the third gear 7, and a ratio of the number of teeth of the second sun gear 13 to the number of teeth of the second ring gear 16 will be referred to as a second gear ratio $u_2$ between the second gear 6 and the fourth gear 8.

In the geared speed reducing unit 1 shown in FIG. 1, the number of teeth $z_{r1}$ of the first ring gear 15 is set to 22, the number of teeth $z_{r2}$ of the second ring gear 16 is set to 21, the number of teeth $z_{s1}$ of the first sun gear 12 is set to 16, and the number of teeth $z_{s2}$ of the second sun gear 13 is set to 15. Accordingly, the first gear ratio $u_1$ may be expressed as:

$$u_1 = z_{s1}/z_{r1} = 16/22 \approx 0.727; \text{ and}$$

the second gear ratio $u_2$ may be expressed as:

$$u_2 = z_{s2}/z_{r2} = 15/21 \approx 0.714.$$

As described, the number of teeth $z_{s2}$ of the second sun gear 13 is one less than the number of teeth $z_{s1}$ of the first sun gear 12, and the number of teeth $z_{r2}$ of the second ring gear 16 is one less than the number of teeth $z_{r1}$ of the first ring gear 15. For these reasons, the first gear ratio $u_1$ and the second gear ratio $u_2$ are slightly different from each other.

As described, in the geared speed reducing unit 1 shown in FIG. 1, the first sun gear 12 is fixed and not allowed to rotate. Therefore, given that the first gear ratio $u_1$ and the second gear ratio $u_2$ are equal to each other, the second sun gear 13 would not be allowed to rotate. Consequently, a speed reducing ratio of the geared speed reducing unit 1 as a speed ratio of the output element to the input element would reach an infinite value. Specifically, an inverse number of a ratio of a speed of the second sun gear 13 to a speed of the eccentric carrier 9 would reach an infinite value, and the geared speed reducing unit 1 would not be able to function properly. In order to avoid such disadvantage, in the geared speed reducing unit 1 shown in FIG. 1, the first gear ratio $u_1$ and the second gear ratio $u_2$ are set to different values. Therefore, the speed reducing ratio of the geared speed reducing unit 1 may be increased without reaching the infinite value. For example, the speed reducing ratio of the geared speed reducing unit 1 may be reduced by increasing the difference between the first gear ratio u 1 and the second gear ratio $u_2$. By contrast, the speed reducing ratio of the geared speed reducing unit 1 may be increased by reducing the difference between the first gear ratio $u_1$ and the second gear ratio $u_2$.

Specifically, a speed reducing ratio R of the geared speed reducing unit 1 shown in FIG. 1 may be expressed as:

$$R = 1/\{1 - (z_{s1}/z_{r1}) \cdot (z_{r2}/z_{s2})\}$$
$$= 1/\{1 - (16/22) \cdot (21/15)\}$$
$$\approx -55.$$

In general, speed reducing ratios achieved by the conventional planetary gear sets falls within a range of approximately 4 to 10. Thus, the speed reducing ratio R is significantly greater than the speed reducing ratios of the conventional planetary gear sets. In the geared speed reducing unit 1 shown in FIG. 1, the second sun gear 13 serving as the output element rotates in the opposite direction to a rotational direction of the eccentric carrier 9 serving the input element. Therefore, the speed reducing ratio R is expressed as −55 for the sake of convenience.

In the geared speed reducing unit 1 shown in FIG. 1, the eccentric carrier 9 as the input element is rotated in the forward direction when the electric motor 3 rotates in the forward direction (i.e., clockwise). In this situation, the second sun gear 13 as the output element is rotated in the reverse direction (i.e., counterclockwise). According to the present disclosure, the speed reducing ratio R of the geared speed reducing unit 1 may be changed by changing the numbers of teeth $z_{s1}$, $z_{s2}$, $z_{r1}$, and $z_{r2}$ of the first sun gear 12, the second sun gear 13, the first ring gear 15, and the second ring gear 16. In addition, the rotational direction of the second sun gear 13 as the output element may be switched by changing the numbers of teeth $z_{s1}$, $z_{s2}$, $z_{r1}$, and $z_{r2}$ of the first sun gear 12, the second sun gear 13, the first ring gear 15, and the second ring gear 16.

Specifically, in the geared speed reducing unit 1 shown in FIG. 1, the rotational direction of the second sun gear 13 may be switched arbitrarily between the forward direction and the reverse direction by adjusting the numbers of teeth of the gears in such a manner as to satisfy all of the following relational expressions.

For example, the numbers of teeth $z_{s1}$, $z_{s2}$, $z_{r1}$, and $z_{r2}$ of the first sun gear 12, the second sun gear 13, the first ring gear 15, and the second ring gear 16 are set such that both of the following relational expressions are satisfied:

$z_{s2} = z_{s1} + 1$; and $z_{r2} = z_{r1} + 1$.

In this case, a difference between the number of teeth $z_{s1}$ of the first sun gear 12 and the number of teeth $z_{s2}$ of the second sun gear 13 is 1, and a difference between the number of teeth $z_{r1}$ of the first ring gear 15 and the number of teeth $z_{r2}$ of the second ring gear 16 is also 1. Consequently, the second sun gear 13 will be rotated in the forward direction. In this case, therefore, a rotational speed of the second sun gear 13 rotated in the forward direction integrally with the second rotary shaft 11 (i.e., the output shaft) may be reduced lower than a rotational speed of the eccentric carrier 9 rotated integrally with the first rotary shaft 10 (i.e., the input shaft) by the torque of the electric motor 3.

By contrast, the numbers of teeth $z_{s1}$, $z_{s2}$, $z_{r1}$, and $z_{r2}$ of the first sun gear 12, the second sun gear 13, the first ring gear 15, and the second ring gear 16 may also be set such that both of the following relational expressions are satisfied:

$z_{s2} = z_{s1} - 1$; and $z_{r2} = z_{r1} - 1$.

In this case, the difference between the number of teeth $z_{s1}$ of the first sun gear 12 and the number of teeth $z_{s2}$ of the second sun gear 13 is also 1, and the difference between the number of teeth $z_{r1}$ of the first ring gear 15 and the number of teeth $z_{r2}$ of the second ring gear 16 is also 1. Consequently, the second sun gear 13 will be rotated in the reverse direction. In this case, therefore, a rotational speed of the second sun gear 13 rotated in the reverse direction integrally with the second rotary shaft 11 (i.e., the output shaft) may be reduced lower than a rotational speed of the eccentric carrier 9 rotated integrally with the first rotary shaft 11 (i.e., the input shaft) by the torque of the electric motor 3.

Table 1 shows a relation between: the numbers of teeth $z_{s1}$, $z_{s2}$, $z_{r1}$, and $z_{r2}$ of the first sun gear 12, the second sun gear 13, the first ring gear 15, and the second ring gear 16; and the speed reducing ratio R of the geared speed reducing unit 1, in a case of reducing a speed of the output shaft rotated in the forward direction. On the other hand, Table 2 shows a relation between: the numbers of teeth $z_{s1}$, $z_{s2}$, $z_{r1}$, and $z_{r2}$ of the first sun gear 12, the second sun gear 13, the first ring gear 15, and the second ring gear 16; and the speed reducing ratio R of the geared speed reducing unit 1, in a case of reducing a speed of the output shaft rotated in the reverse direction.

TABLE 1

INVOLUTE GEAR • FORWARD
$z_{r2} = z_{r1} - 1$
$z_{s2} = z_{s1} - 1$
$z_{s1} = z_{r1} - 6$
$z_{s2} = z_{r2} - 6$

| NUMBER OF TEETH | | | | SPEED REDUCING RATIO |
|---|---|---|---|---|
| $z_{r1}$ | $z_{r2}$ | $z_{s1}$ | $z_{s2}$ | R |
| 9 | 10 | 3 | 4 | 6 |
| 10 | 11 | 4 | 5 | 8 |
| 11 | 12 | 5 | 6 | 11 |
| 12 | 13 | 6 | 7 | 14 |
| 13 | 14 | 7 | 8 | 17 |
| 14 | 15 | 8 | 9 | 21 |
| 15 | 16 | 9 | 10 | 25 |
| 16 | 17 | 10 | 11 | 29 |
| 17 | 18 | 11 | 12 | 34 |
| 18 | 19 | 12 | 13 | 39 |
| 19 | 20 | 13 | 14 | 44 |
| 20 | 21 | 14 | 15 | 50 |
| 21 | 22 | 15 | 16 | 56 |
| 22 | 23 | 16 | 17 | 62 |

TABLE 1-continued

INVOLUTE GEAR • FORWARD
$z_{r2} = z_{r1} - 1$
$z_{s2} = z_{s1} - 1$
$z_{s1} = z_{r1} - 6$
$z_{s2} = z_{r2} - 6$

| NUMBER OF TEETH | | | | SPEED REDUCING RATIO |
|---|---|---|---|---|
| $z_{r1}$ | $z_{r2}$ | $z_{s1}$ | $z_{s2}$ | R |
| 23 | 24 | 17 | 18 | 69 |
| 24 | 25 | 18 | 19 | 76 |
| 25 | 26 | 19 | 20 | 83 |
| 26 | 27 | 20 | 21 | 91 |
| 27 | 28 | 21 | 22 | 99 |
| 28 | 29 | 22 | 23 | 107 |
| 29 | 30 | 23 | 24 | 116 |
| 30 | 31 | 24 | 25 | 125 |

TABLE 2

INVOLUTE GEAR • REVERSE
$z_{r2} = z_{r1} + 1$
$z_{s2} = z_{s1} + 1$
$z_{s1} = z_{r1} - 6$
$z_{s2} = z_{r2} - 6$

| NUMBER OF TEETH | | | | SPEED REDUCING RATIO |
|---|---|---|---|---|
| $z_{r1}$ | $z_{r2}$ | $z_{s1}$ | $z_{s2}$ | R |
| 10 | 9 | 4 | 3 | -5 |
| 11 | 10 | 5 | 4 | -7 |
| 12 | 11 | 6 | 5 | -10 |
| 13 | 12 | 7 | 6 | -13 |
| 14 | 13 | 8 | 7 | -16 |
| 15 | 14 | 9 | 8 | -20 |
| 16 | 15 | 10 | 9 | -24 |
| 17 | 16 | 11 | 10 | -28 |
| 18 | 17 | 12 | 11 | -33 |
| 19 | 18 | 13 | 12 | -38 |
| 20 | 19 | 14 | 13 | -43 |
| 21 | 20 | 15 | 14 | -49 |
| 22 | 21 | 16 | 15 | -55 |
| 23 | 22 | 17 | 16 | -61 |
| 24 | 23 | 18 | 17 | -68 |
| 25 | 24 | 19 | 18 | -75 |
| 26 | 25 | 20 | 19 | -82 |
| 27 | 26 | 21 | 20 | -90 |
| 28 | 27 | 22 | 21 | -98 |
| 29 | 28 | 23 | 22 | -106 |
| 30 | 29 | 24 | 23 | -115 |
| 31 | 30 | 25 | 24 | -124 |

As can be seen from Tables 1 and 2, the speed reducing ratio R of the geared speed reducing unit 1 may be changed within a range from approximately 5 to 124. Thus, the geared speed reducing unit 1 may establish the speed reducing ratio greater than 120.

Specifically, Tables 1 and 2 individually show the above-mentioned relations of a case in which an involute gear is adopted as the first sun gear 12, the second sun gear 13, the first ring gear 15, and the second ring gear 16, respectively. In a case that that the involute gear is adopted as the first sun gear 12, the second sun gear 13, the first ring gear 15, and the second ring gear 16, respectively, tips of the internal gear and the external gear will interfere with each other. In this case, therefore, a difference between the teeth numbers of the internal gear and the external gear may not be set to 1. For this reason, in the examples shown in Tables 1 and 2, a difference between the number of teeth $z_{r1}$ of the first ring gear 15 and the number of teeth $z_{s1}$ of the first sun gear 12 is set to 6, and a difference between the number of teeth $z_{r2}$ of the second ring gear 16 and the number of teeth $z_{s2}$ of the second sun gear 13 is also set to 6. That is, in the examples shown in Tables 1 and 2, the numbers of teeth $z_{s1}$, $z_{s2}$, $z_{r1}$, and $z_{r2}$ of the first sun gear 12, the second sun gear 13, the first ring gear 15, and the second ring gear 16 are set such that both of the following relational expressions are satisfied:

$z_{s1} = z_{r1} - 6$; and $z_{s2} = z_{r2} - 6$.

Given that a cycloid gear is adopted as the first sun gear 12, the second sun gear 13, the first ring gear 15, and the second ring gear 16, respectively, a difference between the teeth numbers of the internal gear and the external gear may be set to 1. In this case, accordingly, it is possible to satisfy both of the following relational expressions:

$z_{s1} = z_{r1} - 1$; and $z_{s2} = z_{r2} - 1$.

In this case, therefore, the speed reducing ratio R of the geared speed reducing unit 1 may be increased greater than that of the case in which the involute gear is adopted as the first sun gear 12, the second sun gear 13, the first ring gear 15, and the second ring gear 16, respectively.

Table 3 shows a relation between: the numbers of teeth $z_{s1}$, $z_{s2}$, $z_{r1}$, and $z_{r2}$ of the first sun gear 12, the second sun gear 13, the first ring gear 15, and the second ring gear 16 as the cycloid gears; and the speed reducing ratio R of the geared speed reducing unit 1, in a case of reducing a speed of the output shaft rotated in the reverse direction.

TABLE 3

CYCLOID GEAR • REVERSE
$z_{r2} = z_{r1} + 1$
$z_{s2} = z_{s1} + 1$
$z_{s1} = z_{r1} - 1$
$z_{s2} = z_{r2} - 1$

| NUMBER OF TEETH | | | | SPEED REDUCING RATIO |
|---|---|---|---|---|
| $z_{r1}$ | $z_{r2}$ | $z_{s1}$ | $z_{s2}$ | R |
| 10 | 9 | 9 | 8 | -80 |
| 11 | 10 | 10 | 9 | -99 |
| 12 | 11 | 11 | 10 | -120 |
| 13 | 12 | 12 | 11 | -143 |
| 14 | 13 | 13 | 12 | -168 |
| 15 | 14 | 14 | 13 | -195 |
| 16 | 15 | 15 | 14 | -224 |
| 17 | 16 | 16 | 15 | -255 |
| 18 | 17 | 17 | 16 | -288 |
| 19 | 18 | 18 | 17 | -323 |
| 20 | 19 | 19 | 18 | -360 |
| 21 | 20 | 20 | 19 | -399 |
| 22 | 21 | 21 | 20 | -440 |
| 23 | 22 | 22 | 21 | -483 |
| 24 | 23 | 23 | 22 | -528 |
| 25 | 24 | 24 | 23 | -575 |
| 26 | 25 | 25 | 24 | -624 |
| 27 | 26 | 26 | 25 | -675 |
| 28 | 27 | 27 | 26 | -728 |
| 29 | 28 | 28 | 27 | -783 |
| 30 | 29 | 29 | 28 | -840 |
| 31 | 30 | 30 | 29 | -899 |

As can be seen from Table 3, the speed reducing ratio R of the geared speed reducing unit 1 in this case may be changed within a range from approximately 80 to 899. Thus, the geared speed reducing unit 1 may establish the speed reducing ratio greater than 800.

Figure 3:
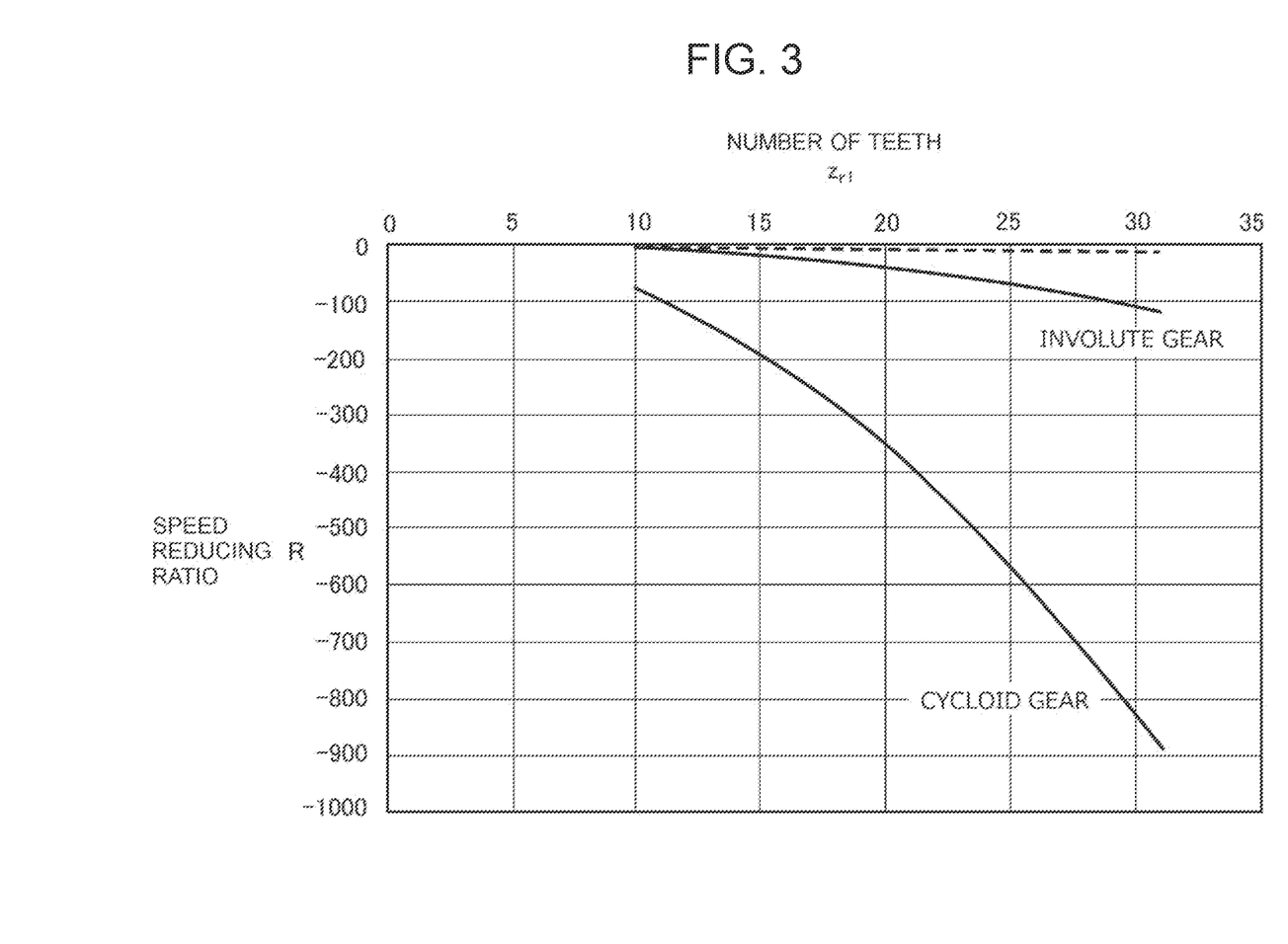
FIG. 3 is a graph showing a comparison between a speed reducing ratio of a case in which the involute gears are employed, and a speed reducing ratio of a case in which the cycloid gears are employed.

FIG. 3 shows a comparison between: the speed reducing ratio R of the case in which the involute gears are adopted as the first sun gear 12, the second sun gear 13, the first ring gear 15, and the second ring gear 16; and the speed reducing ratio R of the case in which the cycloid gears are adopted as the first sun gear 12, the second sun gear 13, the first ring gear 15 and the second ring gear 16, in the case of reducing a speed of the output shaft rotated in the reverse direction. As can be seen from FIG. 3, the speed reducing ratio R of the case in which the cycloid gears are employed is significantly greater than the speed reducing ratio R of the case in which the involute gears are employed. In FIG. 3, the dashed curve indicates a comparative example of a speed reducing ratio calculated based on the internal contact type planetary gear set using the cycloid gears that is described in JP-B2-5970650. According to the teachings of JP-B2-5970650, the teeth number of the internal gear is 31, and the teeth number of the external gear is 30. Accordingly, the speed reducing ratio of the internal contact type planetary gear set taught by JP-B2-5970650 falls within a range from 14 to 15. That is, even if the involute gears are employed, the speed reducing ratio R of the geared speed reducing unit 1 may be increased greater than that of the conventional internal contact type planetary gear set in which the cycloid gears are employed.

Thus, according to the exemplary embodiment of the present disclosure, the speed reducing ratio R of the geared speed reducing unit 1 may be increased arbitrarily by adjusting the first gear ratio $u_1$ between the first sun gear 12 and the first ring gear 15, and the second gear ratio $u_2$ between the second sun gear 13 and the second ring gear 16. That is, the speed reducing ratio R of the geared speed reducing unit 1 may be selected from a wide range. For this reason, even if the less expansive involute gears are employed instead of the expensive cycloid gears, the speed reducing ratio R of the geared speed reducing unit 1 may be increased easily. According to the exemplary embodiment of the present disclosure, therefore, the geared speed reducing unit 1 may be downsized, and the speed reducing ratio R thereof can be increased by a simple structure.

In order to simplify the structure of the geared speed reducing unit 1 shown in FIG. 1, modules and teeth numbers of the first ring gear 15 and the second ring gear 16 may be equalized to each other. In this case, only a set of three gears including the first sun gear 12, the second sun gear 13, and the unit of the first ring gear 15 and the second ring gear 16, and the eccentric carrier 9 are employed in the geared speed reducing unit 1. For this reason, the structure of the geared speed reducing unit 1 may be further simplified so that the geared speed reducing unit 1 may be further downsized.

In the case of equalizing the modules and the teeth numbers of the first ring gear 15 and the second ring gear 16, a difference between the number of teeth $z_{s1}$ of the first sun gear 12 and the number of teeth $z_{s2}$ of the second sun gear 13 is set to 1. Consequently, the first gear ratio $u_1$ between the first sun gear 12 and the first ring gear 15, and the second gear ratio $u_2$ between the second sun gear 13 and the second ring gear 16 are set to slightly different values.

Table 4 shows a relation of this case between: the numbers of teeth $z_{s1}$, $z_{s2}$, $z_{r1}$, and $z_{r2}$ of the first sun gear 12, the second sun gear 13, and the unit of the first ring gear 15, and the second ring gear 16; and the speed reducing ratio R of the geared speed reducing unit 1. Note that Table 4 shows the above-mentioned relation in a case of reducing a speed of the output shaft rotated in the reverse direction.

TABLE 4

INVOLUTE GEAR • REVERSE
$z_{r1} = z_{r2}$
$z_{s2} = z_{s1} - 1$
$z_{s1} = z_{r1} - 6$

| NUMBER OF TEETH | | | | SPEED REDUCING RATIO |
|---|---|---|---|---|
| $z_{r1}$ | $z_{r2}$ | $z_{s1}$ | $z_{s2}$ | R |
| 10 | 10 | 4 | 3 | −3 |
| 11 | 11 | 5 | 4 | −4 |
| 12 | 12 | 6 | 5 | −5 |
| 13 | 13 | 7 | 6 | −6 |
| 14 | 14 | 8 | 7 | −7 |
| 15 | 15 | 9 | 8 | −8 |
| 16 | 16 | 10 | 9 | −9 |
| 17 | 17 | 11 | 10 | −10 |
| 18 | 18 | 12 | 11 | −11 |
| 19 | 19 | 13 | 12 | −12 |
| 20 | 20 | 14 | 13 | −13 |
| 21 | 21 | 15 | 14 | −14 |
| 22 | 22 | 16 | 15 | −15 |
| 23 | 23 | 17 | 16 | −16 |
| 24 | 24 | 18 | 17 | −17 |
| 25 | 25 | 19 | 18 | −18 |
| 26 | 26 | 20 | 19 | −19 |
| 27 | 27 | 21 | 20 | −20 |
| 28 | 28 | 22 | 21 | −21 |
| 29 | 29 | 23 | 22 | −22 |
| 30 | 30 | 24 | 23 | −23 |
| 31 | 31 | 25 | 24 | −24 |

As can be seen from Table 4, the speed reducing ratio R of the geared speed reducing unit 1 in which the teeth numbers of the first ring gear 15 and the second ring gear 16 are equalized to each other may be changed within a range from approximately 3 to 24. Thus, the geared speed reducing unit 1 thus modified may achieve the speed reducing ratio greater than 20.

Figure 4:
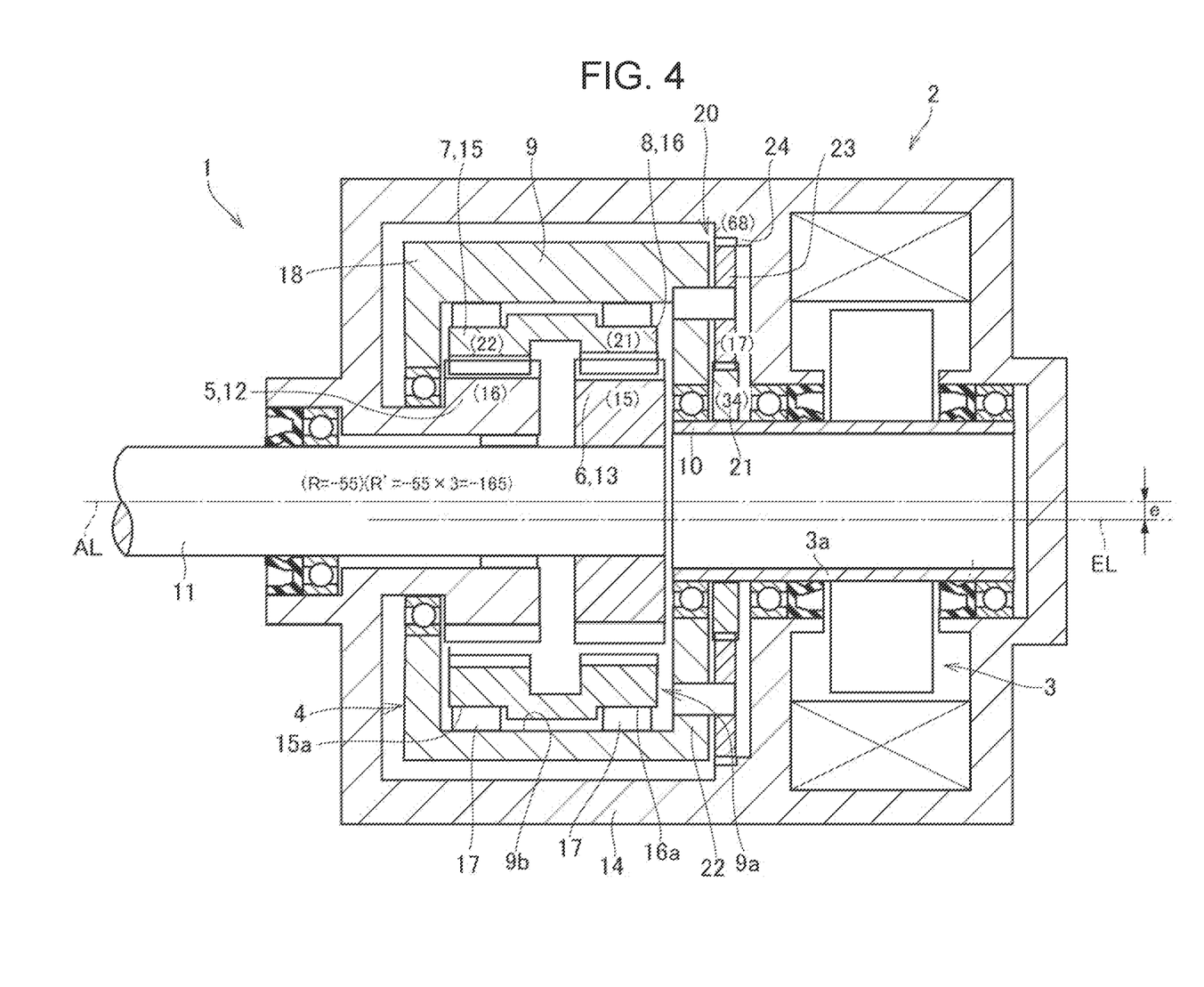
FIG. 4 is a cross-sectional view showing another example of the structure of the geared speed reducing unit according to the exemplary embodiment of the present disclosure.
Figure 5:
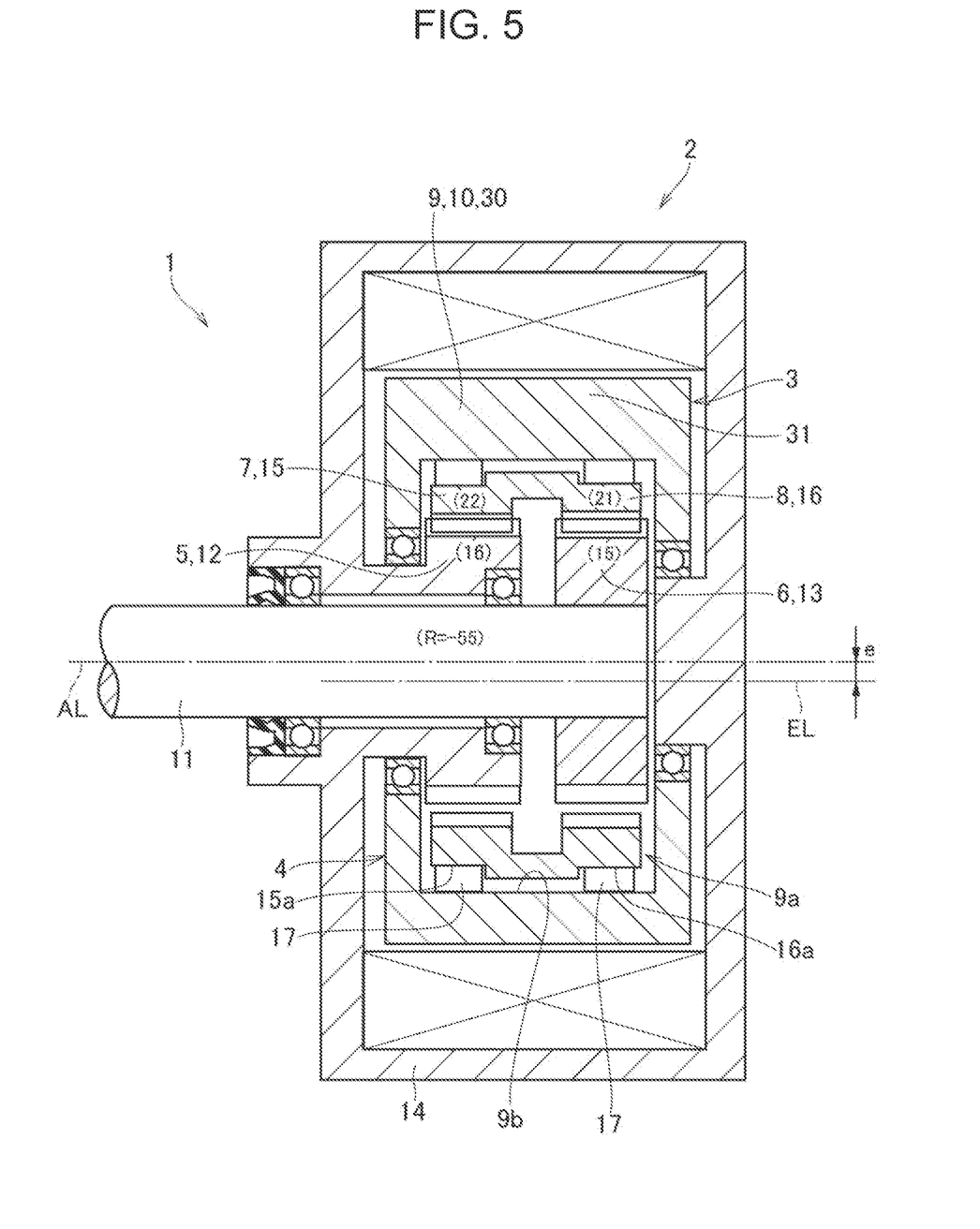
FIG. 5 is a cross-sectional view showing still another example of the structure of the geared speed reducing unit according to the exemplary embodiment of the present disclosure.

Modifications of the geared speed reducing unit 1 shown in FIG. 1 are shown in FIGS. 4 and 5. In FIGS. 4 and 5, common reference numerals are assigned to the elements in common with those of the geared speed reducing unit 1 shown in FIG. 1.

According to another example shown in FIG. 4, the geared speed reducing unit 1 is provided with a speed reducing planetary gear set 20. The speed reducing planetary gear set 20 is arranged between the first rotary shaft 10 and the eccentric carrier 9 to reduce a rotational speed of the eccentric carrier 9 lower than a rotational speed of the first rotary shaft 10. In other words, an output torque of the electric motor 3 is delivered to the eccentric carrier 9 while being multiplied by the speed reducing planetary gear set 20.

Specifically, the speed reducing planetary gear set 20 is a single-pinion planetary gear set formed coaxially with the electric motor 3 and the geared speed reducing unit 1 between the first rotary shaft 10 and the eccentric carrier 9. The speed reducing planetary gear set 20 comprises a sun gear 21, a carrier 22, a planetary gear 23, and a ring gear 24.

The sun gear 21 as an external gear is mounted on the first rotary shaft 10 supported by the case 14 in a rotatable manner so that the sun gear 21 is rotated integrally with the first rotary shaft 10. The carrier 22 supports the planetary gear 23 in a rotatable manner. Specifically, the carrier 22 is joined to the eccentric carrier 9 of the geared speed reducing unit 1 so that the carrier 22 is rotated integrally with the eccentric carrier 9. The ring gear 24 as an internal gear is fixed to the case 14, and the planetary gear 23 is interposed between the ring gear 24 and the sun gear 21.

When the sun gear 21 is rotated by an output torque of the electric motor 3, the ring gear 24 serves as a reaction element of the speed reducing planetary gear set 20 so that a rotational speed of the carrier 22 is reduced lower than a rotational speed of the sun gear 21. That is, the speed reducing planetary gear set 20 serves as an additional reduction gear set so that the output torque of the electric motor 3 is delivered to the eccentric carrier 9 while being multiplied by the speed reducing planetary gear set 20.

As indicated in FIG. 4, the number of teeth of the sun gear 21 is 34, the number of teeth of the ring gear 24 is 68, and the number of teeth of the planetary gear 23 is 17. Accordingly, a speed reducing ratio of the speed reducing planetary gear set 20 is 3. Therefore, based on the fact that the speed reducing ratio R of the geared speed reducing unit 1 shown in FIG. 1 is −55, an actual speed reducing ratio R' of the geared speed reducing unit 1 shown in FIG. 4 taking into account the speed reducing ratio of the speed reducing planetary gear set 20 is:

$$R' = -55 \cdot 3 = -165.$$

Thus, the speed reducing ratio R' of the geared speed reducing unit 1 shown in FIG. 4 is multiplied by the speed reducing planetary gear set 20 to be greater than the speed reducing ratio R of the geared speed reducing unit 1 shown in FIG. 1.

According to still another example shown in FIG. 5, the geared speed reducing unit 1 is arranged radially inner side of the electric motor 3. Specifically, in the geared speed reducing unit 1 shown in FIG. 5, the eccentric carrier 9 and the first rotary shaft 10 are formed integrally with a hollow rotor 30 of the electric motor 3, and the first sun gear 12, the second sun gear 13, the first ring gear 15, and the second ring gear 16 are held in a hollow space of the rotor 30. That is, the geared speed reducing unit 1 shown in FIG. 5 serves as the gear head 4 combined with the electric motor 3. In other words, the geared speed reducing unit 1 is combined with the electric motor 3 to serve as the geared motor 2.

As illustrated in FIG. 5, a thickness of an upper section of the rotor 30 in FIG. 5 is increased thicker than the remaining section to serve as a counterbalance weight 31. Thus, the counterbalance weight 31 is formed integrally with the rotor 30 while adjusting a weight to a desirable value. Instead, the counterbalance weight 31 may also be formed separately to be attached to an outer circumferential surface of the rotor 30.

As explained above, when the internal gears such as the first ring gear 15 and the second ring gear 16 revolve around the rotational center axis AL, the eccentric carrier 9 rotates out-of-balance due to imbalance of weight of the unit of the internal gears. In order to correct such unbalance of rotation of the eccentric carrier 9, the counterbalance weight 31 is formed on the rotor 30. To this end, for example, the counterbalance weight 31 is formed on the rotor 30 at a site out of phase with a heaviest portion of the unit of the internal gears by 180 degrees. According to the example shown in FIG. 5, gear teeth are also not formed on the outer circumferential surfaces 15a and 16a of the unit of the first ring gear 15 and the second ring gear 16 that rotates eccentrically. Therefore, an outer diameter of the unit of the first ring gear 15 and the second ring gear 16 may be reduced so that a space for the counterbalance weight 31 may be ensured on the outer circumferential surface of the eccentric carrier 9. Thus, rotations of the rotary members in the geared motor 2 may be stabilized by the counterbalance weight 31.

As described, according to the example shown in FIG. 5, the geared speed reducing unit 1 is arranged radially inner side the electric motor 3. According to the example shown in FIG. 5, therefore, the geared motor 2 may be downsized in the axial direction. In other words, an axial length of the geared motor 2 may be reduced.

In the foregoing examples, the case is maintained in a liquid-tight condition by sealing members illustrated in the drawings, and rotary members are supported rotatably by bearings illustrated in the drawings.

Although the above exemplary embodiment of the present disclosure has been described, it will be understood by those skilled in the art that the present disclosure should not be limited to the described exemplary embodiments, and various changes and modifications can be made within the scope of the present disclosure. As described, in the foregoing examples, the geared speed reducing unit 1 is adapted to serve as a speed reducing device that reduces a speed of the second rotary shaft 11 lower than a speed of the first rotary shaft 10. Nonetheless, the geared speed reducing unit 1 is adapted to serve as a speed increasing device that increase a speed of the second rotary shaft 11 higher than a speed of the first rotary shaft 10. For example, the geared speed reducing unit 1 may be adapted to serve as a speed increasing device of a wind power generator. In this case, the second rotary shaft 11 is connected to a rotary shaft of a windmill, and the first rotary shaft 10 is connected to an input shaft of the wind power generator. Consequently, a speed of the input shaft of the wind power generator may be increased higher than a speed of the windmill so that a power generation efficiency of the wind power generator may be improved.

What is claimed is:

1. A geared speed reducing unit, comprising:
a first rotary shaft and a second rotary shaft arranged coaxially with each other;
a first gear that is arranged around a common rotational axis of the first rotary shaft and the second rotary shaft and that is not allowed to rotate;
a second gear that is arranged around the common rotational axis to be rotated integrally with the second rotary shaft;
a third gear that meshes with the first gear;
a fourth gear that is arranged coaxially with the third gear to be meshed with the second gear and to be rotated integrally with the third gear; and
an eccentric carrier that is arranged around the common rotational axis to support the third gear and the fourth gear such that the third gear and the fourth gear rotate around an eccentric axis offset from the common rotational axis and revolve around the common rotational axis,
wherein the geared speed reducing unit is adapted to reduce a rotational speed of the second rotary shaft lower than a rotational speed of the first rotary shaft,
the first gear includes a first sun gear as an external gear,
the second gear includes a second sun gear as an external gear,
the third gear includes a first ring gear as an internal gear,
the fourth gear includes a second ring gear as an internal gear,
the eccentric carrier supports outer circumferential surfaces of the first ring gear and the second ring gear such that the first ring gear and the second ring gear are rotated by a torque delivered through the first rotary shaft around the eccentric axis while revolving around the common rotational axis, and a gear ratio between the first sun gear and the first ring gear and a gear ratio between the second sun gear and the second ring gear are set to different values.

2. The geared speed reducing unit as claimed in claim 1, further comprising:
a speed reducing planetary gear set that is arranged between the first rotary shaft and the eccentric carrier to reduce a rotational speed of the eccentric carrier lower than the rotational speed of the first rotary shaft.

3. The geared speed reducing unit as claimed in claim 1, further comprising:
a counterbalance weight that is formed on an outer circumferential surface of the eccentric carrier to correct an unbalance of rotation of the eccentric carrier.

4. The geared speed reducing unit as claimed in claim 1, further comprising:
a motor having a hollow rotor,
wherein the first rotary shaft and the eccentric carrier are formed integrally with each other to serve as the rotor,
the first sun gear, the second sun gear, the first ring gear, and the second ring gear are held in a hollow space of the rotor, and
the geared speed reducing unit is combined with the motor to serve as a speed reducing mechanism.

5. The geared speed reducing unit as claimed in claim 4, further comprising:
a counterbalance weight that is formed on an outer circumferential surface of the rotor to correct an unbalance of rotation of the rotor.

6. The geared speed reducing unit as claimed in claim 1,
wherein a difference between number of teeth of the first sun gear and number of teeth of the second sun gear is 1, and
a difference between number of teeth of the first ring gear and number of teeth of the second ring gear is 1.

7. The geared speed reducing unit as claimed in claim 1,
wherein modules and teeth numbers of the first ring gear and the second ring gear are equalized to each other, and
the first ring gear and the second ring gear are formed integrally with each other.

8. The geared speed reducing unit as claimed in claim 7,
wherein a difference between number of teeth of the first sun gear and number of teeth of the second sun gear is 1.

* * * * *